US012354597B2

(12) United States Patent
Chang et al.

(10) Patent No.: US 12,354,597 B2
(45) Date of Patent: Jul. 8, 2025

(54) DISFLUENCY DETECTION MODELS FOR NATURAL CONVERSATIONAL VOICE SYSTEMS

(71) Applicant: Google LLC, Mountain View, CA (US)

(72) Inventors: Shuo-yiin Chang, Sunnyvale, CA (US); Bo Li, Fremont, CA (US); Tara N. Sainath, Jersey City, NJ (US); Trevor Strohman, Mountain View, CA (US); Chao Zhang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 279 days.

(21) Appl. No.: 17/822,673

(22) Filed: Aug. 26, 2022

(65) Prior Publication Data

US 2023/0107450 A1 Apr. 6, 2023

Related U.S. Application Data

(60) Provisional application No. 63/262,185, filed on Oct. 6, 2021.

(51) Int. Cl.
*G10L 15/06* (2013.01)
*G10L 15/08* (2006.01)

(52) U.S. Cl.
CPC .......... *G10L 15/063* (2013.01); *G10L 15/083* (2013.01)

(58) Field of Classification Search
CPC ....... G10L 15/22; G10L 15/16; G10L 15/063; G10L 15/02; G10L 15/083
USPC ............ 704/240, 232, 231, E15.04, E15.039
See application file for complete search history.

(56) References Cited

U.S. PATENT DOCUMENTS

| | | | | |
|---|---|---|---|---|
| 10,923,111 | B1 * | 2/2021 | Fan | G10L 15/16 |
| 12,002,451 | B1 * | 6/2024 | Liu | G10L 15/16 |
| 2017/0270919 | A1 * | 9/2017 | Parthasarathi | G10L 17/06 |
| 2018/0350395 | A1 * | 12/2018 | Simko | G10L 15/18 |

(Continued)

OTHER PUBLICATIONS

Chen, Qian et al. “Controllable Time-Delay Transformer for Real-Time Punctuation Prediction and Disfluency Detection.” ICASSP 2020—2020 IEEE International Conference on Acoustics, Speech and Signal Processing (ICASSP) (2020): 8069-8073 (Year: 2020).*

(Continued)

*Primary Examiner* — Richemond Dorvil
*Assistant Examiner* — Rodrigo A Chavez
(74) *Attorney, Agent, or Firm* — Honigman LLP; Brett A. Krueger; Grant Griffith

(57) ABSTRACT

A method includes receiving a sequence of acoustic frames characterizing one or more utterances. At each of a plurality of output steps, the method also includes generating, by an encoder network of a speech recognition model, a higher order feature representation for a corresponding acoustic frame of the sequence of acoustic frames, generating, by a prediction network of the speech recognition model, a hidden representation for a corresponding sequence of non-blank symbols output by a final softmax layer of the speech recognition model, and generating, by a first joint network of the speech recognition model that receives the higher order feature representation generated by the encoder network and the dense representation generated by the prediction network, a probability distribution that the corresponding time step corresponds to a pause and an end of speech.

23 Claims, 8 Drawing Sheets

(56) References Cited

U.S. PATENT DOCUMENTS

| | | | | |
|---|---|---|---|---|
| 2019/0325898 | A1 | 10/2019 | O'Hart Kinney et al. | |
| 2020/0117996 | A1 | 4/2020 | Chang et al. | |
| 2020/0335091 | A1* | 10/2020 | Chang | G10L 15/14 |
| 2021/0375289 | A1* | 12/2021 | Zhu | G10L 15/22 |
| 2022/0351718 | A1* | 11/2022 | Wu | G06N 3/08 |

OTHER PUBLICATIONS

S.-Y. Chang, R. Prabhavalkar, Y. He, T. N. Sainath and G. Simko, "Joint Endpointing and Decoding with End-to-end Models," ICASSP 2019—2019 IEEE International Conference on Acoustics, Speech and Signal Processing (ICASSP), Brighton, UK, 2019, pp. 5626-5630 (Year: 2019).*

Z. Zhou, T. Tan and Y. Qian, "Punctuation Prediction for Streaming On-Device Speech Recognition," ICASSP 2022—2022 IEEE International Conference on Acoustics, Speech and Signal Processing (ICASSP), Singapore, Singapore, 2022, pp. 7277-7281. ( Year: 2022).*

Paria Jamshid Lou and Mark Johnson. 2020. Improving Disfluency Detection by Self-Training a Self-Attentive Model. In Proceedings of the 58th Annual Meeting of the Association for Computational Linguistics, pp. 3754-3763, Online. Association for Computational Linguistics. (Year: 2020).*

Nguyen, T.S., Pham, N., Stueker, S., & Waibel, A.H. (2020). High Performance Sequence-to-Sequence Model for Streaming Speech Recognition. ArXiv, abs/2003.10022. (Year: 2020).*

T. Kourkounakis, A. Hajavi and A. Etemad, "FluentNet: End-to-End Detection of Stuttered Speech Disfluencies With Deep Learning," in IEEE/ACM Transactions on Audio, Speech, and Language Processing, vol. 29, pp. 2986-2999, 2021. (Year: 2021).*

L. Lu, J. Li and Y. Gong, "Endpoint Detection for Streaming End-to-End Multi-Talker ASR," ICASSP 2022—2022 IEEE International Conference on Acoustics, Speech and Signal Processing (ICASSP), Singapore, Singapore, 2022, pp. 7312-7316. (Year: 2022).*

Paria Jamshid Lou et al, "End-to-End Speech Recognition and Disfluency Removal", arxiv.org,Sep. 23, 2020 (Sep. 23, 2020), p. 1-10, XP081768441.

Baiyang Liu et al, "Accurate Endpointing with Expected Pause Duration", Dresden, Germany Sep. 6, 2015 (Sep. 6, 2015), p. 2912-2916, Interspeech 2015, Retrieved from the Internet: URL:http://www.isca-speech.org/archive/interspeech_2015/papers/i15_2912.pdf, XP055302307.

International Search Report and Written Opinion issued in related PCT Application No. PCT/US2022/075550, dated Dec. 13, 2022.

* cited by examiner

DISFLUENCY DETECTION MODELS FOR NATURAL CONVERSATIONAL VOICE SYSTEMS

CROSS REFERENCE TO RELATED APPLICATIONS

This U.S. patent application claims priority under 35 U.S.C. § 119(e) to U.S. Provisional Application 63/262,185, filed on Oct. 6, 2021. The disclosure of this prior application is considered part of the disclosure of this application and is hereby incorporated herein by reference in its entirety.

TECHNICAL FIELD

This disclosure relates to disfluency detection models for natural conversational voice systems.

BACKGROUND

Modern automatic speech recognition (ASR) systems focus on providing not only high quality (e.g., a low word error rate), but also low latency (e.g., a short delay between the user speaking and a transcription appearing). For example, when using a device that implements an ASR system today, there is often an expectation that the ASR system decodes utterances in a streaming fashion that corresponds to real-time or even faster than real-time.

SUMMARY

One aspect of the disclosure provides a computer-implemented method that, when executed on data processing hardware, causes the data processing hardware to perform operations including receiving a sequence of acoustic frames characterizing one or more utterances. At each of a plurality of output time steps, the operations further include: generating, by an encoder network of a speech recognition model, a higher order feature representation for a corresponding acoustic frame in the sequence of acoustic frames; generating, by a prediction network of the speech recognition model, a hidden representation for a corresponding sequence of non-blank symbols output by a final softmax layer of the speech recognition model; and generating, by a first joint network of the speech recognition model that receives the higher order feature representation generated by the encoder network and the hidden representation generated by the prediction network, a probability distribution that the corresponding time step corresponds to a pause and an end of speech.

Implementations of the disclosure may include one or more of the following optional features. In some implementations, the operations further include determining that a probability that the corresponding time step corresponds to the end of speech satisfies an end of speech threshold; and in response to determining that the probability that the corresponding time step corresponds to the end of speech satisfies the threshold, triggering a microphone closing event.

In some implementations, the operations include determining that a probability that the corresponding time step corresponds to the pause satisfies a pause threshold; and emitting a pause token at the corresponding time step based on the determining that the probability of the corresponding time step corresponds to the pause satisfies the pause threshold.

In some examples, the operations include, at each of the plurality of output steps, generating, by a second joint network of the speech recognition model, a probability distribution over possible speech recognition hypotheses. In some implementations, the speech recognition model is trained by a two-stage training process. The two-stage training process may include: a first stage that trains the encoder network, the prediction network, and the second joint network on a speech recognition task; and a second stage that initializes and fine-tunes the first joint network to learn how to predict pause and end of speech locations in utterances. In some examples, parameters of the encoder network, the prediction network, and the second joint network are frozen during the second stage of the two-stage training process. In some implementations, the two-stage training process trains the speech recognition model on a plurality of transcribed training utterances having labels indicating pause and end of speech locations.

In some implementations, the encoder network includes a stack of self-attention blocks. The stack of self-attention blocks may include a stack of conformer blocks or a stack of transformer blocks.

In some examples, generating the hidden representation for the corresponding sequence of non-blank symbols includes for each non-blank symbol in the sequence of non-blank symbols received as input at the corresponding time step: generating, by the prediction network, using a shared embedding matrix, an embedding of the corresponding non-blank symbol; assigning, by the prediction network, a respective position vector to the corresponding non-blank symbol; and weighting, by the prediction network, the embedding proportional to a similarity between the embedding and the respective position vector. Generating the hidden representation further includes generating, as output from the prediction network, a single embedding vector at the corresponding time step, the single embedding vector based on a weighted average of the weighted embeddings, the single embedding vector including the hidden representation.

In some implementations, the prediction network includes a multi-headed attention mechanism, the multi-headed attention mechanism sharing the shared embedding matrix across each head of the multi-headed attention mechanism.

Another aspect of the disclosure provides a system including data processing hardware and memory hardware in communication with the data processing hardware. The memory hardware storing instructions that when executed on the data processing hardware causes the data processing hardware to perform operations. The operations include receiving a sequence of acoustic frames characterizing one or more utterances. The operations further include, at each of a plurality of output steps: generating, by an encoder network of a speech recognition model, a higher order feature representation for a corresponding acoustic frame in the sequence of acoustic frames; generating, by a prediction network of the speech recognition model, a hidden representation for a corresponding sequence of non-blank symbols output by a final softmax layer of the speech recognition model; and generating, by a first joint network of the speech recognition model that receives the higher order feature representation generated by the encoder network and the hidden representation generated by the prediction network, a probability distribution that the corresponding time step corresponds to a pause and an end of speech.

Implementations of the disclosure may include one or more of the following optional features. In some implementations, the operations further include determining that a probability that the corresponding time step corresponds to the end of speech satisfies an end of speech threshold; and in response to determining that the probability that the corresponding time step corresponds to the end of speech satisfies the threshold, triggering a microphone closing event.

In some implementations, the operations include determining that a probability that the corresponding time step corresponds to the pause satisfies a pause threshold; and emitting a pause token at the corresponding time step based on the determining that the probability of the corresponding time step corresponds to the pause satisfies the pause threshold.

In some examples, the operations include, at each of the plurality of output steps, generating, by a second joint network of the speech recognition model, a probability distribution over possible speech recognition hypotheses. In some implementations, the speech recognition model is trained by a two-stage training process. The two-stage training process may include: a first stage that trains the encoder network, the prediction network, and the second joint network on a speech recognition task; and a second stage that initializes and fine-tunes the first joint network to learn how to predict pause and end of speech locations in utterances. In some examples, parameters of the encoder network, the prediction network, and the second joint network are frozen during the second stage of the two-stage training process. In some implementations, the two-stage training process trains the speech recognition model on a plurality of transcribed training utterances having labels indicating pause and end of speech locations.

In some implementations, the encoder network includes a stack of self-attention blocks. The stack of self-attention blocks may include a stack of conformer blocks or a stack of transformer blocks.

In some examples, generating the hidden representation for the corresponding sequence of non-blank symbols includes for each non-blank symbol in the sequence of non-blank symbols received as input at the corresponding time step: generating, by the prediction network, using a shared embedding matrix, an embedding of the corresponding non-blank symbol; assigning, by the prediction network, a respective position vector to the corresponding non-blank symbol; and weighting, by the prediction network, the embedding proportional to a similarity between the embedding and the respective position vector. Generating the hidden representation further includes generating, as output from the prediction network, a single embedding vector at the corresponding time step, the single embedding vector based on a weighted average of the weighted embeddings, the single embedding vector including the hidden representation.

In some implementations, the prediction network includes a multi-headed attention mechanism, the multi-headed attention mechanism sharing the shared embedding matrix across each head of the multi-headed attention mechanism.

Yet another aspect of the disclosure provides a natural conversation automated speech recognition (ASR) model including an encoder, a prediction network, and a first joint network. The encoder configured to receive, as input, a sequence of acoustic frames characterizing one or more utterances; and generate, at each of a plurality of time steps, a higher order feature representation for a corresponding acoustic frame in the sequence of acoustic frames. The prediction network configured to receive, as input, a sequence of non-blank symbols output by a final softmax layer; and generate, at each of the plurality of time steps, a hidden representation. The first joint network configured to receive, as input, the hidden representation generated by the prediction network at each of the plurality of time steps and the higher order feature representation generated by the encoder at each of the plurality of time steps; and generate, at each of the plurality of time steps, a probability distribution of whether the corresponding time step corresponds to a pause and an end of speech.

Implementations of the disclosure may include one or more of the following optional features. In some implementations, the ASR model triggers a microphone closing event based on a probability of the corresponding time step corresponding to end of speech satisfying a threshold.

In some examples, the ASR model also includes a second joint network configured to: receive, as input, the hidden representation generated by the prediction network at each of the plurality of time steps and the higher order feature representation generated by the encoder at each of the plurality of time steps; and generate, at each of the plurality of time steps, a probability distribution over possible speech recognition hypotheses.

In some implementations, the encoder network, the prediction network, and the second joint network are trained on a speech recognition task during a first training stage; and after the first training stage, the first joint network is initialized and fine-tuned to learn how to predict pause and end of speech locations in utterances while parameters of the encoder network, the prediction network, and the second joint network are frozen.

Still another aspect of the disclosure provides a natural conversational automated speech recognition (ASR) system including an ASR model having an encoder, a prediction network, and a first joint network; and a turn taking detector model. The encoder configured to receive, as input, a sequence of acoustic frames characterizing one or more utterances; and generate, at each of a plurality of time steps, a higher order feature representation for a corresponding acoustic frame in the sequence of acoustic frames. The prediction network configured to receive, as input, a sequence of non-blank symbols output by a final softmax layer; and generate, at each of the plurality of time steps, a hidden representation. The joint network configured to: receive, as input, the hidden representation generated by the prediction network at each of the plurality of time steps and the higher order feature representation generated by the encoder at each of the plurality of time steps; and generate, at each of the plurality of time steps, a probability distribution of whether the corresponding time step corresponds to a pause and an end of speech. The turn taking detector model configured to receive, as input, the higher order feature representation generated by the encoder at each of the plurality of time steps; and, for each higher order feature representation, generate a corresponding probability distribution of whether the higher order feature representation corresponds to talking, pause, and end of speech.

A still further aspect of the disclosure provides a natural conversational automated speech recognition (ASR) system including an ASR model having an encoder, a prediction network, and a joint network; and a turn taking detector model. The ASR model including an encoder configured to receive, as input, a sequence of acoustic frames characterizing one or more utterances; and generate, at each of a plurality of time steps, a higher order feature representation for a corresponding acoustic frame in the sequence of acoustic frames. The prediction network configured to receive, as input, a sequence of non-blank symbols output by a final softmax layer; and generate, at each of the plurality of time steps, a hidden representation. The joint network configured to receive, as input, the hidden representation generated by the prediction network at each of the plurality of time steps and the higher order feature representation generated by the encoder at each of the plurality of time steps; and generate, at each of the plurality of time steps, a probability distribution over possible speech recognition hypotheses. The turn-taking detector model configured to receive, as input, the hidden representation generated by the prediction network at each of the plurality of time steps; and generate a corresponding probability distribution of whether a next sub-word unit corresponds to a pause and an end of speech.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
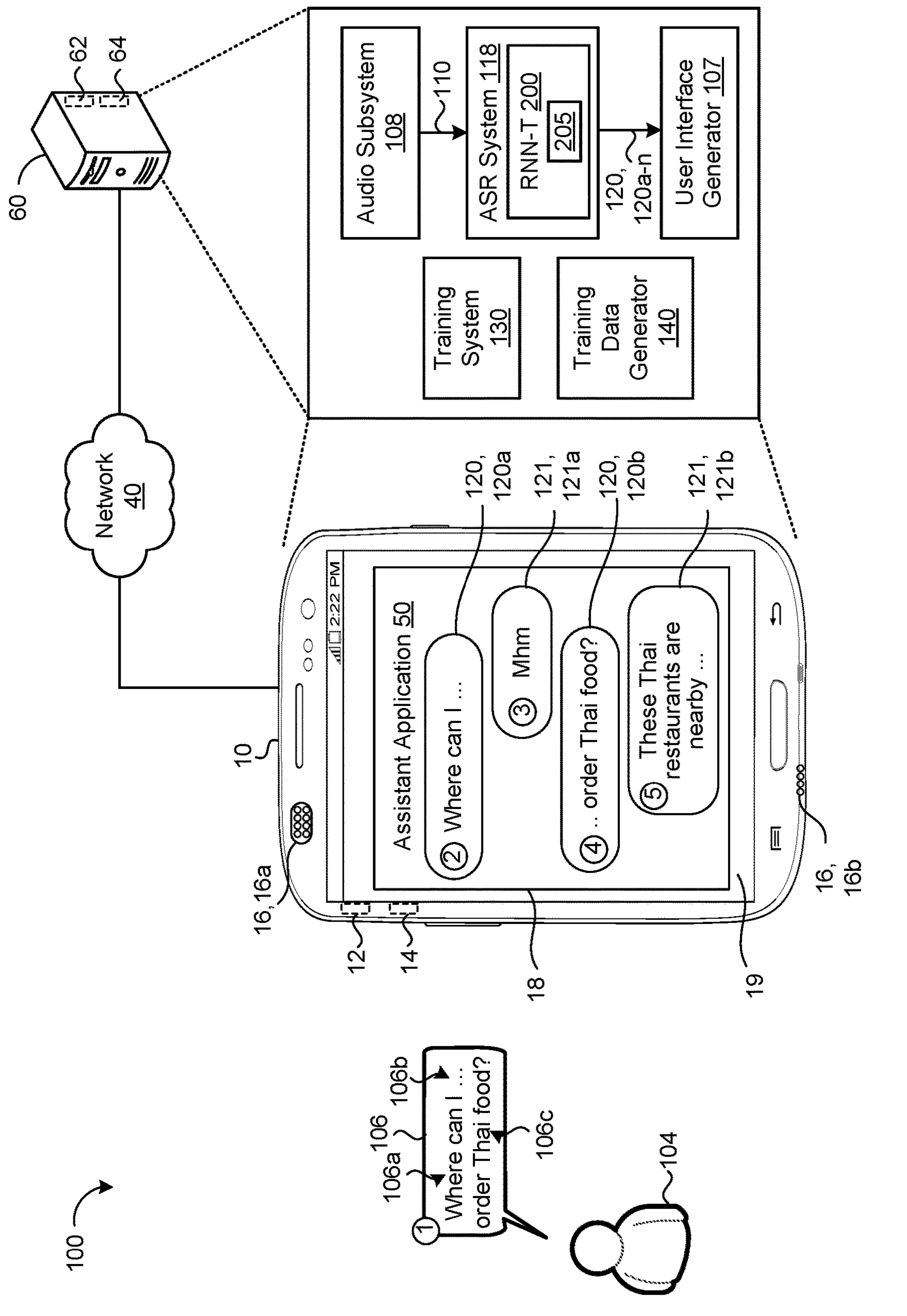
FIG. 1 is a schematic view of an example speech environment using an automatic speech recognition (ASR) system that includes a disfluency detection joint model for transcribing spoken utterances.

Many voice interaction applications, such as voice-activated digital assistants and dialog systems, use streaming automatic speech recognition (ASR) systems. However, to provide a human-like, natural conversational experience, ASR systems need to accurately recognize speech and interaction patterns that resemble human conversational speech, interactions, turn taking, etc. Problems involved in recognizing natural conversational speech include, but are not limited to, recognizing pauses and determining when a person has finished speaking. Even though a lot of natural conversational speech includes disfluencies, most conventional ASR systems assume no disfluencies are present. For example, most conventional ASR systems assume fluent, one-shot utterances for which a person knows what they want to say beforehand, and then speaks without disfluencies. Example disfluencies include, but are not limited to, pauses, pauses to think, random pauses, hesitations, word lengthening (e.g., "onnn . . . "), filler pauses or words (e.g., "uh", "um"), repeated phrases, and changing of actions. Disfluencies may introduce short or long pauses in an utterance, which may cause ambiguity during ASR, such that an ASR system may prematurely endpoint an utterance and interrupt a person before they have finished speaking. For example, a person may start an utterance by speaking "where can I" followed by a pause. During natural conversational speech, the pause may indicate that the person has not finished speaking. However, conventional ASR systems often respond with "sorry, I didn't get that" before the person has a chance to speak the rest of what they intended to speak, e.g., continue by speaking "order Thai food." For natural conversational interactions, it is preferable that the ASR system either respond with an acknowledgement phrase, such as "mmh," during the pause to indicate that the ASR system is waiting for the person to finish speaking, or simply wait for the person to continue and finish speaking. Thus, it is important for natural conversational interactions that ASR systems accurately recognize and handle disfluencies and end-of-speaking events to allow a person to use disfluencies to "hold the floor" until they are done speaking while responding as quickly as possible once the person finishes speaking.

Implementations herein are directed toward integrating an ASR system with a disfluency detection model that is configured and trained to detect disfluencies and end-of-speaking events that occur naturally in spoken utterances of natural conversational interactions. Example disfluency detection models are built on top of, or integrated with, an end-to-end (E2E) ASR model, such as a recurrent neural network-transducer (RNN-T) model. In an example method, an ASR system receives a sequence of acoustic frames characterizing one or more utterances. For each of a plurality of output steps: an encoder network of the ASR model generates a higher order feature representation for a corresponding acoustic frame in the sequence of acoustic frames; a prediction network of the ASR model generates a hidden representation for a corresponding sequence of non-blank symbols output by a final softmax layer of the ASR model; and a first joint network of the ASR model (i.e., a disfluency detection joint network) receives the higher order feature representation and the hidden representation, and generates a probability distribution that the corresponding time step corresponds to a disfluency (e.g., a pause) and an end of speech event. A second joint network (e.g., a word piece joint network) of the ASR model receives the higher order feature representation and the hidden representation at the corresponding time step, and generates a probability distribution over possible speech recognition hypotheses at the corresponding time step.

FIG. 1 is a schematic diagram of an example speech environment 100. In the speech environment 100, a user's 104 manner of interacting with a computing device, such as a user device 10, may be through voice input. The user device 10 (also referred to generally as a device 10) is configured to capture sounds (e.g., streaming audio data) from one or more users 104 within the speech environment 100. Here, the streaming audio data may refer to a spoken utterance 106 by the user 104 that functions as an audible query, a command for the device 10, or an audible communication captured by the device 10. Speech-enabled systems of the device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, vehicle infotainment systems, internet of things (IoT) devices, vehicle infotainment systems, smart displays, smart speakers, etc. The user device 10 includes data processing hardware 12 and memory hardware 14 in communication with the data processing hardware 12. The memory hardware 14 stores instructions that, when executed by the data processing hardware 12, cause the data processing hardware 12 to perform one or more operations. The user device 10 further includes an audio system 16 with an audio capture device (e.g., microphone) 16, 16*a* for capturing and converting spoken utterances 106 within the speech environment 100 into electrical signals, and a speech output device (e.g., a speaker) 16, 16*b* for communicating an audible audio signal (e.g., as output audio data from the device 10). While the user device 10 implements a single audio capture device 16*a* in the example shown, the user device 10 may implement an array of audio capture devices 16*a* without departing from the scope of the present disclosure, whereby one or more capture devices 16*a* in the array may not physically reside on the user device 10, but be in communication with the audio system 16.

In the speech environment 100, an automated speech recognition (ASR) system 118 implementing a recurrent neural network-transducer (RNN-T) model 200 and a disfluency detection model 205 resides on the user device 10 of the user 104 and/or on a remote computing device 60 (e.g., one or more remote servers of a distributed system executing in a cloud-computing environment) in communication with the user device 10 via a network 40. The user device 10 and/or the remote computing device 60 also includes an audio subsystem 108 configured to receive the utterance 106 spoken by the user 104 and captured by the audio capture device 16*a*, and convert the utterance 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., acoustic frames) 110 for input to the ASR system 118. Thereafter, the RNN-T model 200 receives, as input, the acoustic frames 110 corresponding to the utterance 106, and generates/predicts, as output, a corresponding transcription 120 of the utterance 106. In the example shown, the RNN-T model 200 may perform streaming speech recognition to produce partial transcriptions (e.g., streaming speech recognition results) 120*a*, 120*b* as the user speaks.

The user device 10 and/or the remote computing device 60 also executes a user interface generator 107 configured to present representations of the transcriptions 120, 120*a-n* of the utterance 106 to the user 104 of the user device 10, and to present one or more responses 121, 121*a-n* to queries and/or commands of the utterance 106. As described in greater detail below, the user interface generator 107 may display the speech recognition results 120, 120*a-n* and the responses 121, 121*a-n* during or at different times. As shown, the user interface generator 107 may present the speech recognition results 120, 120*a-n* (e.g., transcriptions) and the responses 121, 121*a-n* to represent an interaction/conversation between the user 104 and an interactive program or application (e.g., a digital assistant application 50).

In some configurations, the transcription 120 output from the ASR system 118 are processed, e.g., by a natural language processing/understanding (NLP/NLU) module executing on the user device 10 or the remote computing device 60, to execute a user command/query specified by the utterance 106. The digital assistant application 50 may provide an appropriate response 121 subsequent to executing the user command/query specified by the utterance 106. Additionally or alternatively, a text-to-speech system (not shown) (e.g., executing on any combination of the user device 10 or the remote computing device 60) may convert the transcription 120 and/or the response 121 into synthesized speech for audible output by the user device 10 and/or another device.

In the example shown, the user 104 interacts with a program or application (e.g., the digital assistant application 50) of the user device 10 that uses the ASR system 118. For instance, FIG. 1 depicts the user 104 communicating with the digital assistant application 50, and the digital assistant application 50 displaying an interactive digital assistant interface 18 on a screen 19 of the user device 10 to depict a natural conversational interaction between the user 104 and the digital assistant application 50. In this example, the user 104, during time 1, speaks a first portion 106*a* ("Where can I") of the utterance 106, and then pauses (as represented by ellipsis " . . . ") during a second portion 106*b* of the utterance.

Continuing with this example, the RNN-T model 200, while receiving the acoustic frames 110 corresponding to the utterance 106 as the user 104 speaks, performs speech recognition on the acoustic frames 110 to produce first speech recognition results 120*a* (i.e., "where can I") corresponding to the first portion 106*a* of the utterance 106. In the example shown, the disfluency detection model 205 detects that the acoustic frames 110 corresponding to the second portion 106*b* of the utterance 106 are indicative of a pause in the user's speech rather than an end of speech event which would prematurely endpoint the utterance. During time 2, the user interface generator 107 presents, via the digital assistant interface 18, a representation of the first speech recognition results 120*a* of the utterance 106 to the user 104 of the user device 10 in a streaming fashion such that words, word pieces, and/or individual characters appear on the screen 19 of the user device 10 as soon as they are spoken. Based on the disfluency detection model 205 detecting the presence of the pause during the second portion 106*b*, at time 3, the digital assistant 50 responds with an acknowledgement response 121*a* ("Mhm") to indicate to the user 104 that the ASR system 118 and the digital assistant 50 are waiting for the user 104 to continue speaking.

Continuing with this example, the user 104 commences speaking a third remaining portion 106*c* ("order Thai food") of the utterance 106 after pausing and the RNN-T model 200 performs speech recognition on the audio frames 110 corresponding to the remaining portion 106*c* of the utterance 106 to produce second speech recognition results 120*b* (i.e., "order Thai food"). When the user 104 has finished speaking the remaining portion 106*c* of the utterance 106, the disfluency detection model 205 detects an end of speech event to indicate that the utterance 106 is complete. During time 4, the user interface generator 107 presents, via the digital assistant interface 18, a representation of the second speech recognition results 120*b* of the utterance 106 to the user 104 of the user device 10 in a streaming fashion such that words, word pieces, and/or individual characters appear on the screen 19 of the user device 10 as soon as they are spoken. Notably, the ASR system 118 may trigger a microphone closing event and process the transcription 120 (e.g., by the NLP/NLU module) to execute a user command/query (e.g., perform a search for Thai restaurants) specified by the utterance 106 responsive to the disfluency detection model 205 detecting the end of speech event. At time 5, the user interface generator 107 presents, via the digital assistant interface 18, a response 121*b* (i.e., "These Thai restaurants are nearby . . . ") to the query.

Figure 2A:
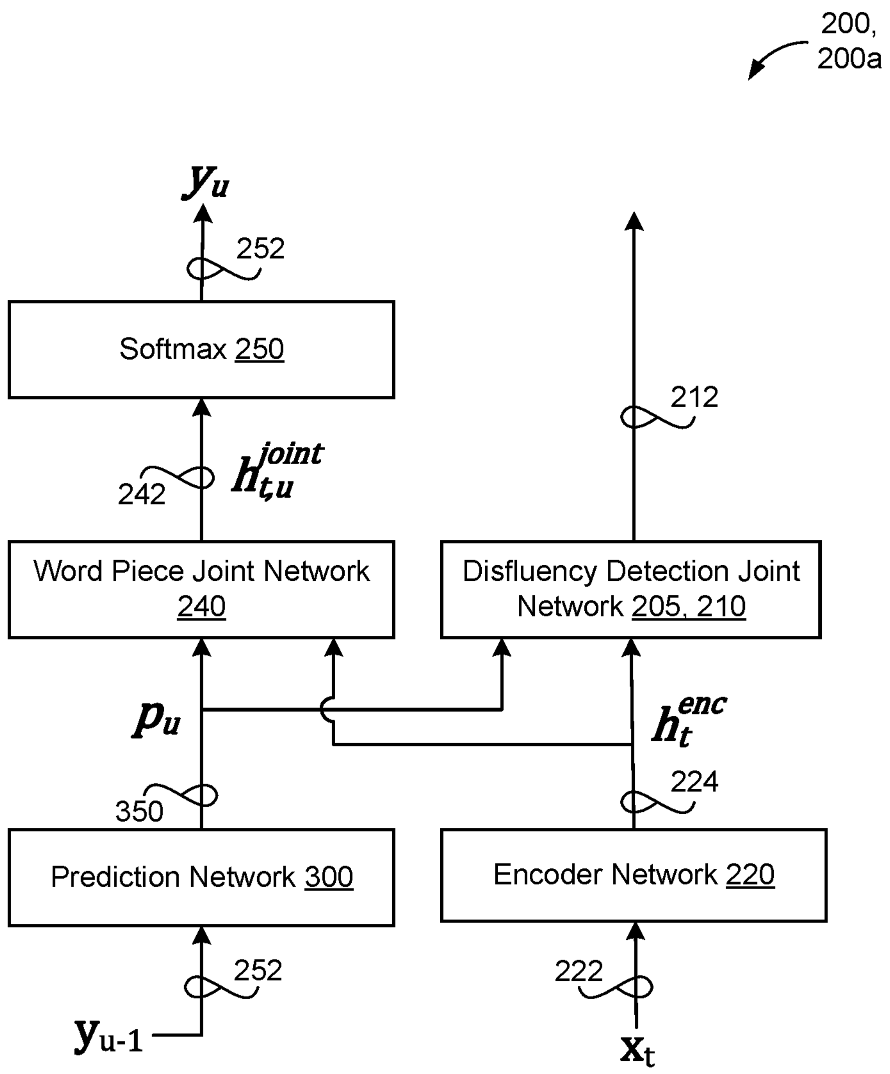
FIGS. 2A-C are schematic views of example ASR systems integrating a disfluency detection model.

FIG. 2A is a schematic view of an example RNN-T model 200, 200*a* integrating the disfluency detection model 205 as a first joint network (i.e., disfluency detection joint network) 210 for detecting disfluencies in spoken utterances that are indicative of speech and interaction patterns that resemble human conversational speech, interactions, and/or turn taking with a digital assistant. Problems involved in recognizing natural conversational speech include, but are not limited to, recognizing pauses and determining when a person has finished speaking. Example disfluencies include, but are not limited to, pauses, pauses to think, random pauses, hesitations, word lengthening (e.g., "onnn . . . "), filler pauses or words (e.g., "uh", "um"), repeated phrases, and changing of actions. These disfluencies, characterized by no voice activity detected for a threshold duration, can trigger conventional ASR systems to prematurely endpoint the utterance before the user has completed speaking the utterance. Such premature endpointing may result in misinterpreted queries that the digital assistant may not be able to process where the digital assistant may interrupt to prompt the user to repeat the query, thereby leading to user frustration.

As shown, the RNN-T model 200*a* includes an encoder network 220, a prediction/decoder network 300, a second joint network 240 (i.e., a word piece joint network 240), and a final softmax output layer 250. The encoder network 220 (e.g., an audio encoder), which is roughly analogous to an acoustic model (AM) in a traditional ASR system, receives a sequence of feature vectors $x=(x_1, x_2, \ldots, x_t)$ 222, where $x_t \in \mathbb{R}_d$ (e.g., the acoustic frames 110 of FIG. 1), and produces at each time step a higher-order feature representation 224 (also generally referred to as an acoustic representation) denoted as $h_t^{enc}=(h_1^{enc}, \ldots, h_t^{enc})$.

In the example shown, the prediction/decoder network 300 includes an LSTM-based prediction network that, like a language model (LM), processes a sequence of non-blank symbols $y_0, \ldots, y_{u-1}$ 252 output so far by the softmax layer 250 into a hidden representation $h_u^{pred}$ 350 (also generally referred to as a dense or linguistic representation) representing a probability distribution of whether a current time step corresponds to a pause and an end of speech, where $y_0$ represents a special start of sequence symbol.

Figure 3:
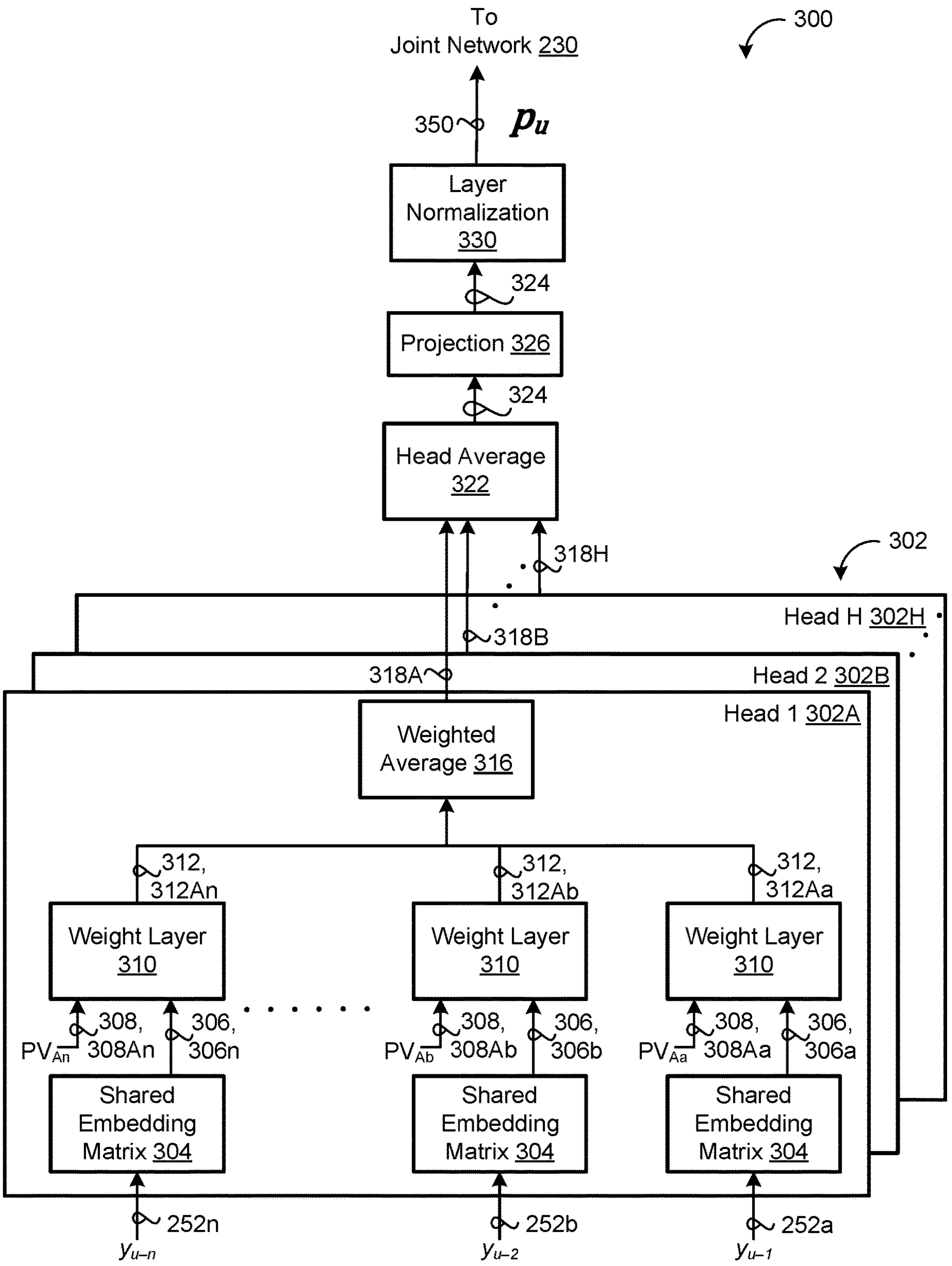
FIG. 3 is a schematic view of an example tied and reduced prediction network of the ASR systems of FIGS. 2A-2C.

FIG. 3 shows the prediction network 300 for the RNN-T model 200 that receives, as input, a sequence of non-blank symbols $y_{u-n}, \ldots, y_{u-1}$ that is limited to the N previous non-blank symbols 252*a-n* output by the final softmax layer 250. In some examples, N is equal to two. In other examples, N is equal to five, however, the disclosure is non-limiting and N may equal any integer. The sequence of non-blank symbols 252*a-n* may indicate a partial speech recognition result 120*a*, 120*b* (FIG. 1). In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism 302 improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306*a-n* (e.g., $X \in \mathbb{R}^{N \times d_e}$) for each non-blank symbol 301 among the sequence of non-blank symbols $y_{ui-n}, \ldots, y_{ui-1}$ received as input at the corresponding time step from the plurality of time steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., $P \in \mathbb{R}^{H \times N \times d_e}$) to each corresponding non-blank symbol in the sequence of non-blank symbols $y_{u-n}, \ldots, y_{u-1}$. The respective position vector PV 308 assigned to each non-blank symbol indicates a position in the history of the sequence of non-blank symbols (e.g., the N previous non-blank symbols output by the final softmax layer 250). For instance, the first position vector $PV_{Aa}$ is assigned to a most recent position in the history, while the last position vector $PV_{An}$ is assigned to a last position in the history of the N previous non-blank symbols output by the final softmax layer 250. Notably, each of the embeddings 306 may include a same dimensionality (i.e., dimension size) as each of the position vectors PV 308.

While the corresponding embedding generated by shared embedding matrix 304 for each for each non-blank symbol 301 among the sequence of non-blank symbols 252*a-n*, $y_{u-n}, \ldots, y_{u-1}$, is the same at all of the heads 302A-H of the multi-headed attention mechanism 302, each head 302A-H defines a different set/row of position vectors 308. For instance, the first head 302A defines the row of position vectors $PV_{Aa-An}$ 308Aa-An, the second head 302B defines a different row of position vectors $PV_{Ba-Bn}$ $308_{Ba-Bn}$, . . . , and the $H^{th}$ head 302 H defines another different row of position vectors $PV_{Ha-Hn}$ $308_{Ha-Hn}$.

For each non-blank symbol in the sequence of non-blank symbols 252*a-n* received, the first head 302A also weights, via a weight layer 310, the corresponding embedding 306 proportional to a similarity between the corresponding embedding and the respective position vector PV 308 assigned thereto. In some examples, the similarity may include a cosine similarity (e.g., cosine distance). In the example shown, the weight layer 310 outputs a sequence of weighted embeddings 312, 312Aa-An each associated the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by:

$$\text{Prediction}(X, P) = \frac{1}{H * N} \sum_{h,n} X_n * \sum_e (X_{n,e} * P_{h,n,e}) \qquad (1)$$

In Equation (1), h represents the index of the heads 302, n represents position in context, and e represents the embedding dimension. Additionally, in Equation (1), H, N, and $d_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A, are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector $P_u$ 350 (i.e., hidden representation) at the corresponding time step from the plurality of time steps. The prediction network 300 generates only a single embedding vector $P_u$ 350 at each of the plurality of time steps subsequent to an initial time step.

In some configurations, the prediction network 300 does not implement the multi-headed attention mechanism 302 and only performs the operations described above with respect to the first head 302A. In these configurations, the weighted average 318A of the weighted embeddings 312Aa-An is simply passed through the projection layer 326 and layer normalization 330 to provide the single embedding vector $P_u$ 350.

Referring back to FIG. 2A, the word piece joint network 240 receives the single embedding vector $P_u$ 350 from the prediction network 300, and the higher-order feature representation $h_{t_i}^{enc}$ from the encoder 220. The word piece joint network 240 generates a probability distribution $h_{t,u}^{joint}=P(y_i|x_{t_i}, y_0, \ldots, y_{u_{i-1}})$ 242 over possible speech recognition hypotheses at the corresponding time step. For example, when the natural language is English, the set of output labels may include twenty-seven (27) symbols, e.g., one label for each of the 26-letters in the English alphabet and one label designating a space. Accordingly, the word piece joint network 240 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the word piece joint network 240 can include a posterior probability value for each of the different output labels. Thus, when there are 100 different output labels representing different graphemes or other symbols, the output $h_{t,u}^{joint}$ 242 of the word piece joint network 240 can include 100 different probability values, one for each output label. The probability distribution $h_{t,u}^{joint}=P(y_i|x_{t_i}, y_0, \ldots, y_{u_{i-1}})$ over the possible speech recognition hypotheses indicates a probability for a speech recognition result 120 (FIG. 1). That is, the joint network 230 determines the probability distribution for speech recognition results 120 using the single embedding vector 350 that is based on the sequence of non-blank symbols 252. Stated differently, the word piece joint network 240 generates, at each output step (e.g., time step), a probability distribution 242 over possible speech recognition hypotheses. The probability distribution $h_{t,u}^{joint}$ 242 can then be used to select and assign scores to candidate orthographic elements (e.g., graphemes, wordpieces, and/or words) in a beam search process (e.g., by the softmax layer 240) for determining the transcriptions 120.

The softmax layer 250 may employ any technique to select the output label/symbol with the highest probability in the distribution $h_{t,u}^{joint}$ 242 as the next output symbol $y_u$ 252 predicted by the RNN-T model 200 at the corresponding output step. In this manner, the RNN-T model 200 does not make a conditional independence assumption. Instead, the RNN-T model 200 predicts each symbol conditioned not only on the acoustics but also on the sequence of labels output so far. The RNN-T model 200 does assume an output symbol is independent of future acoustic frames 110, which allows the RNN-T model 200 to be employed in a streaming fashion. In some examples, the softmax layer 250 is composed of a unified word piece or grapheme set that is generated using all unique word pieces or graphemes in a plurality of training data sets.

The first joint network (i.e., the disfluency detection joint network) 210 generates, based on the higher order feature representation $h_t^{enc}$ 224 output by the encoder network 220 and the single embedding vector $P_u$ 350 output by the prediction network 300, a probability distribution that the corresponding time step corresponds to a disfluency (e.g., a pause) or an end of speech event. Stated differently, the first joint network can output a set of values indicative of the likelihood of occurrence of each of a predetermined set of output labels including <pause> for a pause, and <eos> for an end of speech event. This set of values can be a vector and can indicate a probability distribution over the set of output labels. The probability distribution providing the conditional probability of a pause and the conditional probability of an end of speech event can be determined using the following mathematical expressions:

$$P_{pause}^{joint}=P_{disfluency}(\text{<pause>}|x_t, y_0, \ldots, y_{u-1}, y_u) \quad (2)$$

$$P_{eos}^{joint}=P_{disfluency}(\text{<eos>}|x_t, y_0, \ldots, y_{u-1}, y_u) \quad (3)$$

where $y_u$ is the output word piece hypothesis with the highest probability $h_{t,u}^{joint}$ 242. The disfluency detection joint network 210 emits tokens 212 (e.g., <pause> and <eos> tokens) when the corresponding probability satisfies (e.g., exceeds) a predefined threshold. For example, when $P_{pause}^{joint}$ satisfies (e.g., exceeds) an end of speech threshold an <eos> token 212 is emitted and when $P_{eos}^{joint}$ satisfies (e.g., exceeds) a pause threshold a <pause> token 212 is emitted. The end of speech threshold and the pause threshold need not have the same value. In some examples, detection of an end of speech event (e.g., a probability that a corresponding time step corresponds to an end of speech satisfies an end of speech threshold) triggers a microphone closing event by the user device 10 by, for example, emitting an end of speech token 212 that causes the triggering of the microphone closing event.

With reference to FIGS. 1 and 2A, in order to ensure the RNN-T 200*a* has the same speech recognition quality as conventional RNN-T, a training system 130 (FIG. 1) trains the RNN-T 200 using a two-stage training processing. During a first stage, the training system 130 trains the encoder network 220, the prediction network 300, and the word piece joint network 240 on a speech recognition task to perform speech recognition. During a second stage, the training system 130 holds the parameters of the encoder network 220, the prediction network 300, and the word piece joint network 240 fixed, while initializing and fine-tuning (e.g., training) the disfluency detection joint network 210 to learn how to detect the presence of pauses and end of speech events. That is, the training system 130 trains the disfluency detection joint network 210 to learn how to predict pause and end of speech locations in utterances. The training system 130 trains the disfluency detection joint network 210 using a plurality of transcribed training utterances that has be annotated by, for example, a training data generator 140 (FIG. 1) to include labels (e.g., <pause> and <eos>) indicating pause and end of speech locations. For example, the training data generator 140 can insert <pause> tokens for pauses, and insert <eos> tokens at the end of utterances.

For short-form utterances that contain a single voice query, the training data generator 140 appends <eos> tokens to the end of each utterance, and inserts <pause> tokens for silence segments determined, for example, using forced alignment. While short-form utterances can be used to model end of speech events and regular short pauses, they may not cover a broader range of possible disfluencies. Moreover, because only a single <eos> token is appended to the end of each utterance, the disfluency detection joint network 210 may learn to stop emitting any additional <eos> tokens after determining a first end of speech event in an utterance, which may cause disfluency detection problems for longer utterances or utterances with multiple disfluencies.

Referring back to FIG. 2A, the feature vectors x 222 input to the encoder network 220 may include 80-dimensional log-Mel filter bank features formed by stacking three 25 millisecond (ms) acoustic frames with a 10 ms shift, and downsampling to a 30 ms frame rate. In some examples, the encoder network 220 includes twelve 512-dimensional conformer layers. The conformer layers include causal convolution with a kernel size of 15, and a stack of left-context attention layers with 8-head self-attention. While the encoder network 220 described has a stack of multi-head attention layers/blocks with self-attention that include conformer layers/blocks (e.g., twelve conformer blocks), the present disclosure is not so limited. For instance, the encoder network 220 may include a stack of transformer layers/or a stack of any other type of multi-head attention layers/bocks. The encoder network 220 may include a series of multi-headed self-attention, depth-wise convolutional and feed-forward layers. Alternatively, the encoder network 220 may include a plurality of long-short term memory (LSTM) layers in lieu of multi-head attention layers/blocks.

The prediction network 300 may include an LTSM-based network having an embedding dimension of 320. The dimension $D^{joint}$ of the fused representation $h_{t,u}^{joint}$ 232 may be set to 640. In some examples, the word piece joint network 240 includes hidden units. Additionally or alternatively, the word piece joint network 240 does not include a fully connected (FC) layer. Alternatively, the prediction network 300 may include a stack of transformer or conformer blocks (or other type of multi-head attention blocks). The prediction network 300 may also be an embedding look-up table (e.g., a V2 embedding look-up table) to improve latency by outputting looked-up sparse embeddings in lieu of generating hidden representations. In some implementations, the prediction network 300 is a stateless prediction network.

The word piece joint network 240 and the prediction network 300 may collective form an RNN-T decoder of the RNN-T model 200. In some implementations, to further reduce the size of the RNN-T decoder, i.e., the prediction network 300 and the word piece joint network 240, parameter tying between the prediction network 300 and the word piece joint network 240 is applied. Specifically, for a vocabulary size |V| and an embedding dimension $d_e$, the shared embedding matrix 304 at the prediction network is $E \in \mathbb{R}^{|V| \times d_e}$. Meanwhile, a last hidden layer includes a dimension size $d_h$ at the joint network 240, feed-forward projection weights from the hidden layer to the output logits will be $W \in \mathbb{R}^{d_h \times |V+1|}$, with an extra blank token in the vocabulary. Accordingly, the feed-forward layer corresponding to the last layer of the word piece joint network 240 includes a weight matrix $[d_h, |V|]$. By having the prediction network 300 to tie the size of the embedding dimension $d_e$ to the dimensionality $d_h$ of the last hidden layer of the word piece joint network 240, the feed-forward projection weights of the word piece joint network 240 and the shared embedding matrix 304 of the prediction network 300 can share their weights for all non-blank symbols via a simple transpose transformation. Since the two matrices share all their values, the RNN-T decoder only needs to store the values once in memory, instead of storing two individual matrices. By setting the size of the embedding dimension $d_e$ equal to the size of the hidden layer dimension $d_h$, the RNN-T decoder reduces a number of parameters equal to the product of the embedding dimension $d_e$ and the vocabulary size |V|. This weight tying corresponds to a regularization technique.

Figure 2B:
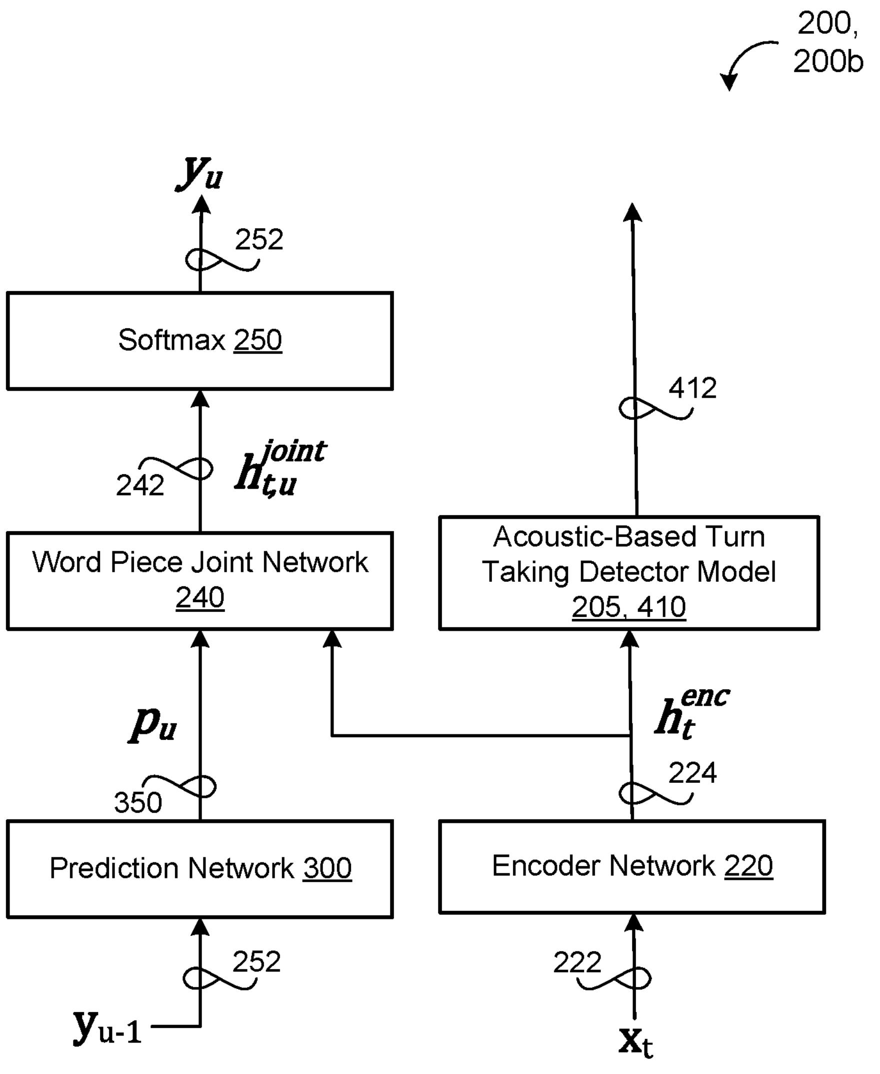

FIG. 2B is a schematic view of an example RNN-T model 200, 200*b* integrating the disfluency detection model 205 as an acoustic-based turn taking detector 410 to compute, at each corresponding time step (i.e., for each acoustic frame 222 x(t), a probability distribution that the corresponding time step corresponds to the disfluency (e.g., pause) and the end of speech event. As shown, the RNN-T model 200*b* includes the encoder network 220, the prediction/decoder network 300, the word piece joint network 240, and the final softmax output layer 250 of the RNN-T model 200*a* of FIG. 2A, but replaces the disfluency detection joint network 210 with the acoustic-based turn taking detection network 205. Details of the encoder network 220, the prediction/decoder network 300, the word piece joint network 240, and the final softmax output layer 250 are described above with reference to FIGS. 2A and 3.

The acoustic-based turn taking detection network 410 generates, for each input feature vector $x_t$ at time step t and based on the higher order feature representation $h_t^{enc}$ 224 produced by the encoder network 220 for input feature vectors $x_t, x_{t-1}, \ldots, x_{t-k}$ 222, the probability distribution that the corresponding time step corresponds to the pause and the end of speech event. Stated differently, the acoustic-based turn taking detection network 410 can output a set of values indicative of the likelihood of occurrence of each of a predetermined set of output labels including <pause> for a pause, and <eos> for an end of speech event. This set of values can be a vector and can indicate a probability distribution over the set of output labels. The probability distribution providing the conditional probability of a pause and the conditional probability of an end of speech event can be determined using the following mathematical expressions:

$$P_{pause}^{acoustic}=P_{disfluency}(<\text{pause}>|x_t,x_{t-1}, \ldots ,x_{t-k}) \quad (4)$$

$$P_{eos}^{acoustic}=P_{disfluency}(<\text{eos}>|x_t,x_{t-1}, \ldots ,x_{t-k}) \quad (5)$$

The turn taking detection network 410 emits tokens 412 (e.g., <pause> and <eos> tokens) when the corresponding probability satisfies (e.g., exceeds) a predefined threshold. For example, when $P_{pause}^{acoustic}$ satisfies (e.g., exeeds) an end of speech threshold an <eos> token 412 is emitted and when $P_{eos}^{acoustic}$ satisfies (e.g., exceeds) a pause threshold a <pause> token 412 is emitted. The end of speech threshold and the pause threshold need not have the same value. In some examples, detection of an end of speech event (e.g., a probability that a corresponding time step corresponds to an end of speech satisfies an end of speech threshold) triggers a microphone closing event by the user device 10 by, for example, emitting an end of speech token 412 that causes the triggering of the microphone closing event.

By sharing the encoder network 220, the RNN-T 200*a* synchronizes speech recognition by the RNN-T decoder, i.e., the prediction network 300 and the word piece joint network 240, with turn taking detection by the acoustic-based turn taking detection network 410, which helps ensure correct interactions for natural conversational inputs. Moreover, because the turn taking detection network 410 reuses the encoder network 220, it is not necessary to configure or include another separate encoder, which reduces computational complexity. Because delayed or late disfluency detection may introduce slow responses to queries and commands, some examples apply an emission regularization method (e.g., FastEmit) to the turn taking detection network 410 to reduce disfluency detection delays. To ensure the RNN-T 200*b* has the same speech recognition quality as conventional RNN-T, the training system 130 (FIG. 1) trains the RNN-T 200*b* in two stages in a similar manner as described above with reference to the RNN-T 200*a* of FIG. 2A.

Figure 2C:
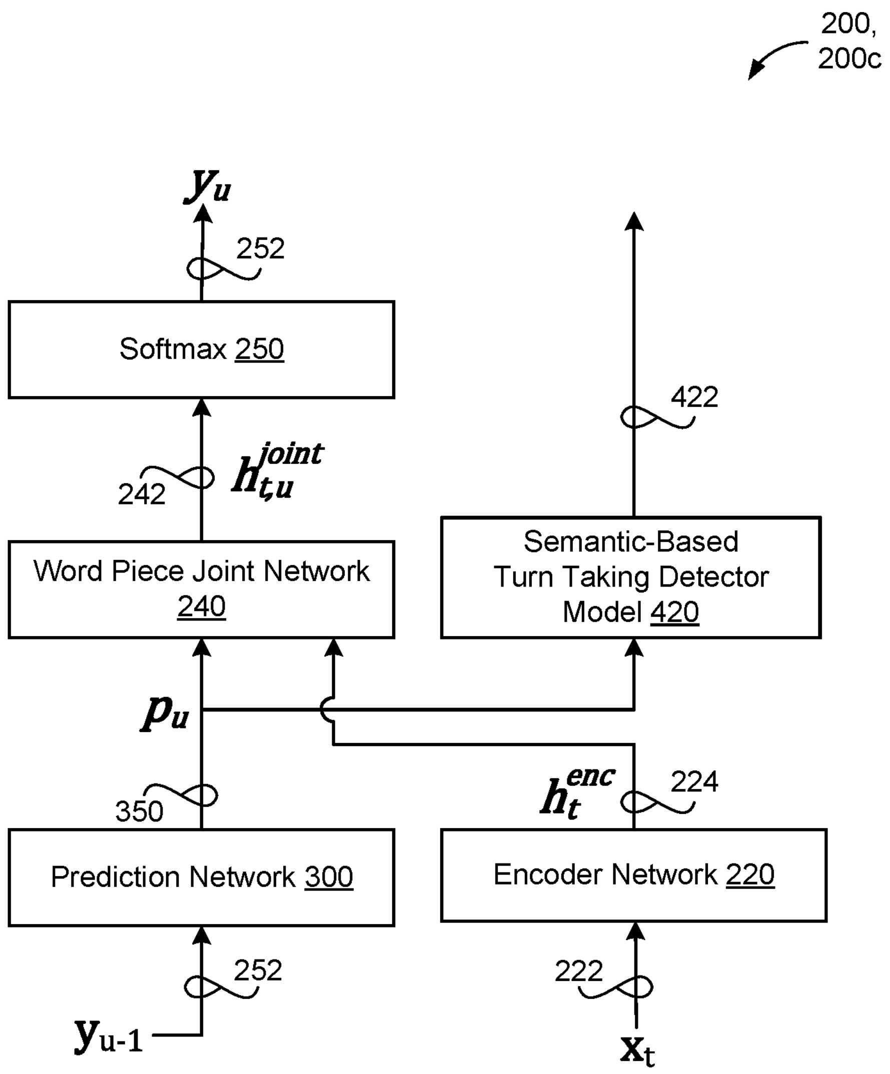

FIG. 2C is a schematic view of an example RNN-T model 200, 200*c* integrating the disfluency detection model 205 as a semantic-based turn taking detection network 420 to compute, at each corresponding time step, a probability distribution that the corresponding time step corresponds to the disfluency (e.g., pause) and the end of speech event. As shown, the RNN-T model 200*b* includes the encoder network 220, the prediction/decoder network 300, the word piece joint network 240, and the final softmax output layer 250 of the RNN-T model 200*a* of FIG. 2A, but replaces the disfluency detection joint network 210 with the acoustic-based turn taking detection network 205. Details of the encoder network 220, the prediction/decoder network 300, the word piece joint network 240, and the final softmax output layer 250 are described above with reference to FIGS. 2A and 3.

The semantic-based turn taking detection network 420 generates, for each time step and based on a past sequence of output symbols $y_0, y_1, \ldots, y_u$ 252 output by the softmax layer 250, the probability distribution that the corresponding time step corresponds to the disfluency (e.g., a pause) and the end of speech event. Stated differently, the semantic-based turn taking detection network 420 can output a set of values indicative of the likelihood of occurrence of each of a predetermined set of output labels including <pause> for a pause, and <eos> for an end of speech event. This set of values can be a vector and can indicate a probability distribution over the set of output labels. The probability distribution providing the conditional probability of a pause and the conditional probability of an end of speech event can be determined using the following mathematical expressions:

$$P_{pause}^{semantic}=P_{disfluency}(<\text{pause}>|y_0,y_1, \ldots ,y_u) \quad (6)$$

$$P_{eos}^{semantic}=P_{disfluency}(<\text{eos}>|y_0,y_1, \ldots ,y_u \quad (7)$$

In some examples, the semantic-based turn taking detection network 420 includes a language model (LM) that determines probabilities that a next output symbol (e.g., sub-word unit) corresponds to a <pause> and an <eos>. The semantic-based turn taking detection network 420 emits tokens 422 (e.g., <pause> and <eos> tokens) when the corresponding probability satisfies (e.g., exceeds) a predefined threshold. For example, when $P_{pause}^{semantic}$ satisfies (e.g., exceeds) an end of speech threshold an <eos> token 422 is emitted and when $P_{eos}^{semantic}$ satisfies (e.g., exceeds) a pause threshold a <pause> token 422 is emitted. The end of speech threshold and the pause threshold need not have the same value. In some examples, detection of an end of speech event (e.g., a probability that a corresponding time step corresponds to an end of speech satisfies an end of speech threshold) triggers a microphone closing event by the user device 10 by, for example, emitting an end of speech token 422 that causes the triggering of the microphone closing event. To ensure the RNN-T 200*c* has the same speech recognition quality as conventional RNN-T, the training system 130 (FIG. 1) trains the RNN-T 200*c* in two stages in a similar manner as described above with reference to the RNN-T 200*a* of FIG. 2A.

Figure 4A:
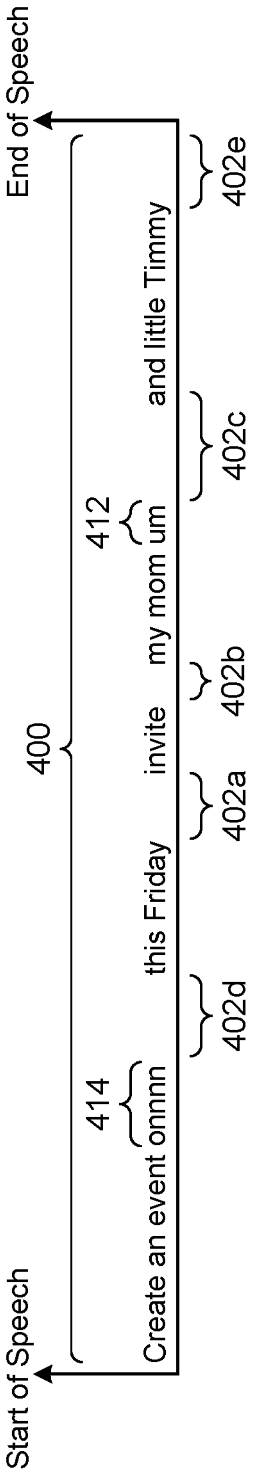
FIG. 4A depicts an example long-form transcribed training utterance.
Figure 4B:
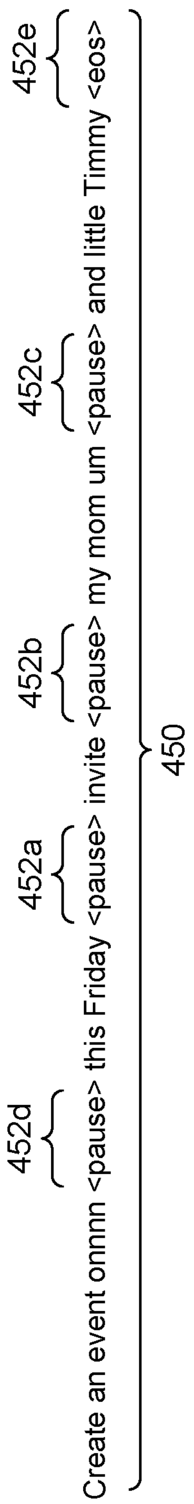
FIG. 4B depicts an example annotated transcribed training utterance for the long-form transcribed training utterance of FIG. 4A.

FIG. 4A depicts an example transcribed long-form training utterance 400. FIG. 4B depicts an example annotated transcribed training utterance 450 generated by the training data generator 140 for the transcribed long-form training utterance 500 of FIG. 4A. For long-form utterances (e.g., tens of seconds long and/or containing multiple speech segments including more natural conversational voice inputs and interactions), the training data generator 140 determines silence segments 402, 402*a-n* using, for example, forced alignment, and determines sentence boundaries based on silence durations. For example, the training data generator 140 labels short silent pauses (e.g., silent pauses 402*a* and 402*b*) with respective <pause> tokens (e.g., tokens 452*a* and 452*b*), at least initially labels long silent pauses (e.g., silent pauses 402*c* and 402*d*) with respective <eos> tokens, and labels a final silent pause (e.g., silent pause 402*e*) with an <eos> token (e.g., token 452*e*). In some examples, a silent pause is determined to be short or long by comparing the duration of the silent pause to a pre-determined threshold. For example, the training data generator 140 classifies silent pause durations less than the pre-determined threshold as short, and classifies silent pause durations greater than the pre-determined threshold as long. However, labeling long silent pauses in this way may cause the training data generator 140 to incorrectly label some long silent pauses (e.g., the silent pauses 402*c* and 402*d*) with <eos> tokens. Accordingly, the training data generator 140 re-labels silent pauses (e.g., the silent pause 402*c*) of any length that follow a hesitation word 412 (a filler, repeated phrase, etc.) with <pause> tokens (e.g., token 452*c*). Moreover, the training data generator 140 re-labels silent pauses (e.g., the silent pause 402*d*) of any length that follow word lengthening 414 with <pause> tokens (e.g., token 452*d*). In some examples, the training data generator 140 determines word lengthening when a last phoneme of a word or word piece has a duration that satisfies a criteria (e.g., exceeds 10 standard deviations as pre-computed for the phoneme).

Figure 5:
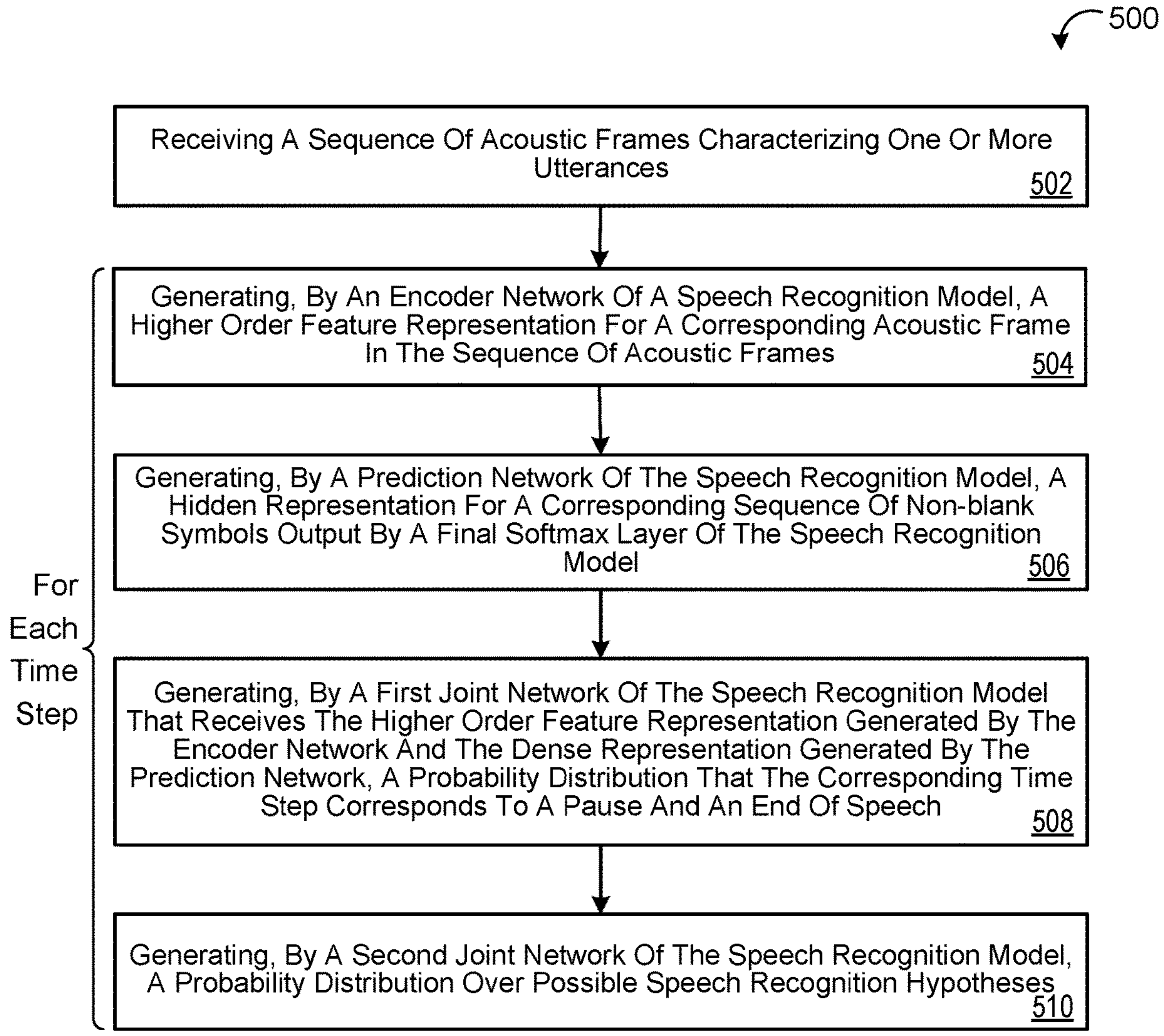
FIG. 5 is a flowchart of an example arrangement of operations for a computer-implemented method of executing a disfluency detection joint model in an ASR system.

FIG. 5 is a flowchart of an exemplary arrangement of operations for a computer-implemented method 500 for detecting disfluencies and performing speech recognition. At operation 502, the method 500 includes receiving a sequence of acoustic frames (e.g., the feature vectors $x=(x_1, x_2, \ldots, x_t)$ 110, 222) characterizing one or more utterances (e.g., the utterance 106).

At each of a plurality of time steps, the method 500 performs operations 504, 506, 508 and 510. At operation 504, the method 500 includes generating, by an encoder network 220 of a speech recognition model (e.g., the RNN-T 200), a higher order feature representation $h_t^{enc}$ 224 for a corresponding acoustic frame in the sequence of acoustic frames.

At operation 506, the method 500 includes generating, by a prediction network 300 of the speech recognition model, a hidden representation (e.g., the single embedding vector $P_u$ 350) for a corresponding sequence of non-blank symbols $y_0, y_1, \ldots, y_u$ 252 output by a final softmax layer 250 of the speech recognition model.

At operation 508, the method 500 includes generating, by a first joint network (e.g., the disfluency detection joint network) 210 of the speech recognition model that receives the higher order feature representation generated by the encoder network and the dense representation generated by the prediction network, a probability distribution that the corresponding time step corresponds to a pause and an end of speech.

At operation 510, the method 500 includes generating, by a second joint network (e.g., the word piece joint network) 240 of the speech recognition model, a probability distribution $h_{t,u}^{joint}$ 242 over possible speech recognition hypotheses.

Figure 6:
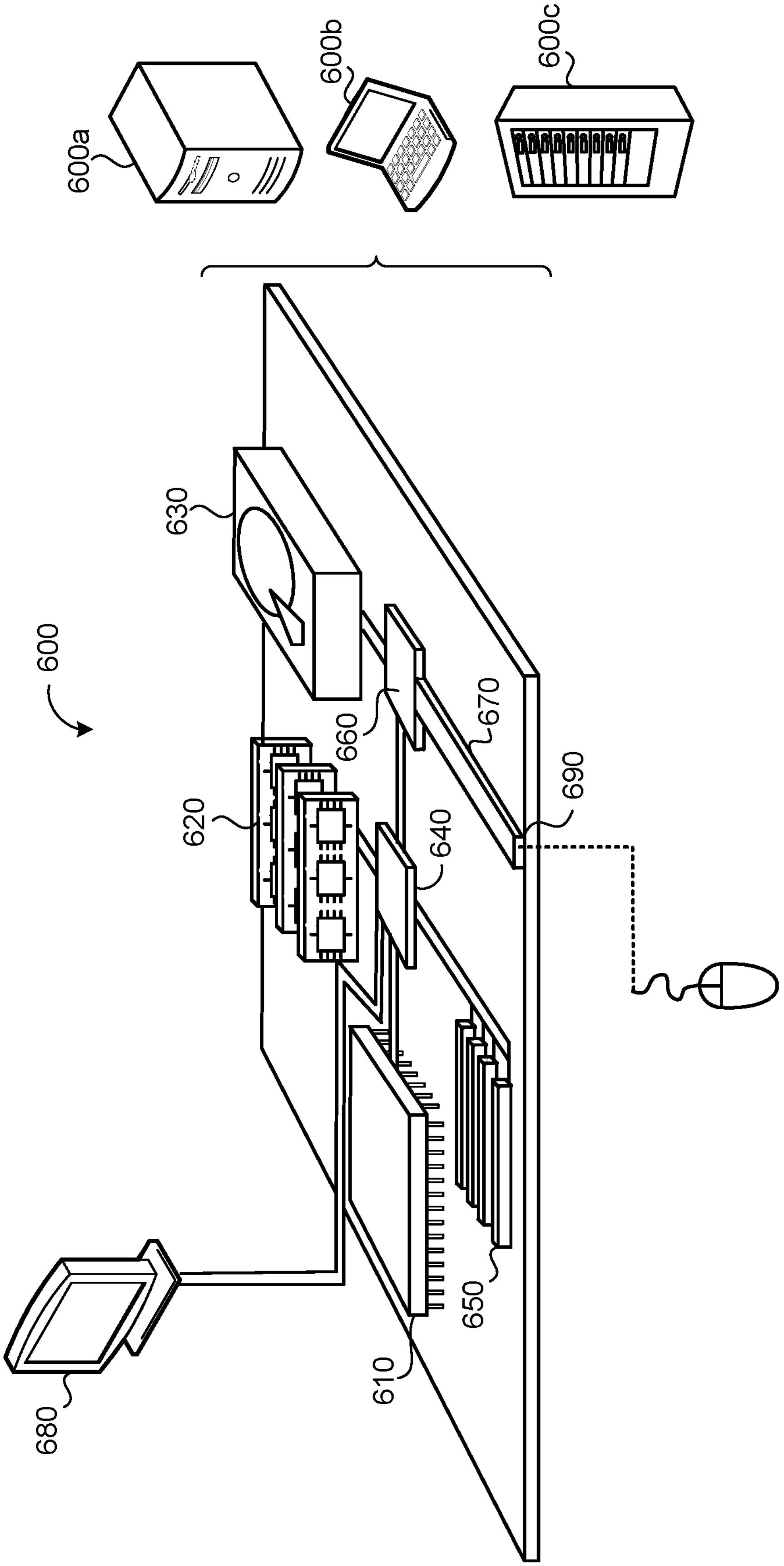
FIG. 6 is a schematic view of an example computing device that may be used to implement the systems and methods described herein.

FIG. 6 is schematic view of an example computing device 600 that can be used to implement the systems and methods described in this document. The computing device 600 is intended to represent various forms of digital computers, such as laptops, desktops, workstations, personal digital assistants, servers, blade servers, mainframes, and other appropriate computer devices. The components shown here, their connections and relationships, and their functions, are meant to be exemplary only, and are not meant to limit implementations of the inventions described and/or claimed in this document.

The computing device 600 includes a processor 610 (i.e., data processing hardware) that can be used to implement the data processing hardware 12 and/or 62, memory 620 (i.e., memory hardware) that can be used to implement the memory hardware 14 and/or 64, a storage device 630 (i.e., memory hardware) that can be used to implement the memory hardware 14 and/or 64, a high-speed interface/controller 640 connecting to the memory 620 and high-speed expansion ports 650, and a low speed interface/controller 670 connecting to a low speed bus 660 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/lectronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 670 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 670 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:

receiving a sequence of acoustic frames characterizing one or more utterances; and at each of a plurality of time steps:

generating, by an encoder network of a speech recognition model, a higher order feature representation for a corresponding acoustic frame in the sequence of acoustic frames;

outputting, by a final softmax layer of the speech recognition model, a sequence of non-blank output symbols;

generating, by a prediction network of the speech recognition model, a hidden representation for the sequence of non-blank output symbols;

generating, by a first joint network of the speech recognition model that receives the higher order feature representation generated by the encoder network and the hidden representation generated by the prediction network, a first probability distribution that the corresponding time step corresponds to a disfluency and an end of speech; and generating, by a second joint network of the speech recognition model different from the first joint network that receives the higher order feature representation generated by the encoder network and the hidden representation generated by the prediction network, a second probability distribution over possible speech recognition hypotheses, wherein the final softmax layer outputs, based on the second probability distribution, a next non-blank output symbol.

2. The computer-implemented method of claim 1, wherein the operations further comprise:

determining that the probability that the corresponding time step corresponds to the end of speech satisfies an end of speech threshold; and in response to determining that the probability that the corresponding time step corresponds to the end of speech satisfies the end of speech threshold, triggering a microphone closing event.

3. The computer-implemented method of claim 1, wherein the operations further comprise:

determining that the probability that the corresponding time step corresponds to the disfluency satisfies a disfluency threshold; and emitting a disfluency token at the corresponding time step based on the determining that the probability of the corresponding time step corresponds to the disfluency satisfies the disfluency threshold.

4. The computer-implemented method of claim 1, wherein the speech recognition model is trained by a two-stage training process, the two-stage training process comprising:

a first stage that trains the encoder network, the prediction network, and the second joint network on a speech recognition task; and a second stage that initializes and fine-tunes the first joint network to learn how to predict pause and end of speech locations in utterances.

5. The computer-implemented method of claim 4, wherein parameters of the encoder network, the prediction network, and the second joint network are frozen during the second stage of the two-stage training process.

6. The computer-implemented method of claim 4, wherein the two-stage training process trains the speech recognition model on a plurality of transcribed training utterances having labels indicating pause and end of speech locations.

7. The computer-implemented method of claim 1, wherein the encoder network comprises a stack of self-attention blocks.

8. The computer-implemented method of claim 7, wherein the stack of self-attention blocks comprises a stack of conformer blocks or a stack of transformer blocks.

9. The computer-implemented method of claim 1, wherein generating the hidden representation for the sequence of non-blank output symbols comprises:

for each non-blank output symbol in the sequence of non-blank output symbols received as input at the corresponding time step:

generating, by the prediction network, using a shared embedding matrix, an embedding of the non-blank output symbol;

assigning, by the prediction network, a respective position vector to the non-blank output symbol; and weighting, by the prediction network, the embedding proportional to a similarity between the embedding and the respective position vector; and generating, as output from the prediction network, a single embedding vector at the corresponding time step, the single embedding vector based on a weighted average of the weighted embeddings, the single embedding vector comprising the hidden representation.

10. The computer-implemented method of claim 9, wherein the prediction network comprises a multi-headed attention mechanism, the multi-headed attention mechanism sharing the shared embedding matrix across each head of the multi-headed attention mechanism.

11. A system comprising:

data processing hardware; and memory hardware in communication with the data processing hardware and storing instructions that, when executed on the data processing hardware, causes the data processing hardware to perform operations comprising:

receiving a sequence of acoustic frames characterizing one or more utterances; and at each of a plurality of output steps:

generating, by an encoder network of a speech recognition model, a higher order feature representation for a corresponding acoustic frame in the sequence of acoustic frames;

outputting, by a final softmax layer of the speech recognition model, a sequence of non-blank output symbols;

generating, by a prediction network of the speech recognition model, a hidden representation for the sequence of non-blank output symbols;

generating, by a first joint network of the speech recognition model that receives the higher order feature representation generated by the encoder network and the hidden representation generated by the prediction network, a first probability distribution that the corresponding time step corresponds to a disfluency and an end of speech; and generating, by a second joint network of the speech recognition model different from the first joint network that receives the higher order feature representation generated by the encoder network and the hidden representation generated by the prediction network, a second probability distribution over possible speech recognition hypotheses, wherein the final softmax layer outputs, based on the second probability distribution, a next non-blank output symbol.

12. The system of claim 11, wherein the operations further comprise:

determining that the probability that the corresponding time step corresponds to the end of speech satisfies an end of speech threshold; and in response to determining that the probability that the corresponding time step corresponds to the end of speech satisfies the end of speech threshold, triggering a microphone closing event.

13. The system of claim 11, wherein the operations further comprise:

determining that the probability that the corresponding time step corresponds to the disfluency satisfies a disfluency threshold; and emitting a disfluency token at the corresponding time step based on the determining that the probability of the corresponding time step corresponds to the disfluency satisfies the disfluency threshold.

14. The system of claim 11, wherein the speech recognition model is trained by a two-stage training process, the two-stage training process comprising:

a first stage that trains the encoder network, the prediction network, and the second joint network on a speech recognition task; and a second stage that initializes and fine-tunes the first joint network to learn how to predict pause and end of speech locations in utterances.

15. The system of claim 14, wherein parameters of the encoder network, the prediction network, and the second joint network are frozen during the second stage of the two-stage training process.

16. The system of claim 14, wherein the two-stage training process trains the speech recognition model on a plurality of transcribed training utterances having labels indicating pause and end of speech locations.

17. The system of claim 11, wherein the encoder network comprises a stack of self-attention blocks.

18. The system of claim 17, wherein the stack of self-attention blocks comprises a stack of conformer blocks or a stack of transformer blocks.

19. The system of claim 11, wherein generating the hidden representation for the sequence of non-blank output symbols comprises:

for each non-blank output symbol in the sequence of non-blank output symbols received as input at the corresponding time step:

generating, by the prediction network, using a shared embedding matrix, an embedding of the non-blank output symbol;

assigning, by the prediction network, a respective position vector to the non-blank output symbol; and weighting, by the prediction network, the embedding proportional to a similarity between the embedding and the respective position vector; and generating, as output from the prediction network, a single embedding vector at the corresponding time step, the single embedding vector based on a weighted average of the weighted embeddings, the single embedding vector comprising the hidden representation.

20. The system of claim 19, wherein the prediction network comprises a multi-headed attention mechanism, the multi-headed attention mechanism sharing the shared embedding matrix across each head of the multi-headed attention mechanism.

21. A system comprising:

data processing hardware; and memory hardware in communication with the data processing hardware and storing instructions that, when executed on the data processing hardware, causes the data processing hardware to perform operations for executing a natural conversation automated speech recognition (ASR) model comprising:

an encoder network configured to:

receive, as input, a sequence of acoustic frames characterizing one or more utterances; and generate, at each of a plurality of time steps, a higher order feature representation for a corresponding acoustic frame in the sequence of acoustic frames;

a final softmax layer configured to output a sequence of non-blank output symbols;

a prediction network configured to:

receive, as input, the sequence of non-blank output symbols output by the final softmax layer; and generate, at each of the plurality of time steps, a hidden representation;

a first joint network configured to:

receive, as input, the hidden representation generated by the prediction network at each of the plurality of time steps and the higher order feature representation generated by the encoder network at each of the plurality of time steps; and generate, at each of the plurality of time steps, a first probability distribution that the corresponding time step corresponds to a disfluency and an end of speech; and a second joint network different from the first joint network and configured to:

receive the higher order feature representation generated by the encoder network and the hidden representation generated by the prediction network; and generate, at each of the plurality of time steps, a second probability distribution over possible speech recognition hypotheses, wherein the final softmax layer outputs, based on the second probability distribution, a next non-blank output symbol.

22. The system of claim 21, wherein the ASR model triggers a microphone closing event based on the probability that the corresponding time step corresponds to end of speech satisfying a threshold.

23. The system of claim 21, wherein:

the encoder network, the prediction network, and the second joint network are trained on a speech recognition task during a first training stage; and after the first training stage, the first joint network is initialized and fine-tuned to learn how to predict pause and end of speech locations in utterances while parameters of the encoder network, the prediction network, and the second joint network are frozen.

* * * * *